US012404164B2

(12) United States Patent
Van Geijlswijk

(10) Patent No.: US 12,404,164 B2
(45) Date of Patent: Sep. 2, 2025

(54) BEVERAGE CONTAINER COOLING SYSTEM FOR A BEVERAGE DISPENSING DEVICE

(71) Applicant: Heineken Supply Chain B.V., Amsterdam (NL)

(72) Inventor: Petrus Johannes Van Geijlswijk, Voorschoten (NL)

(73) Assignee: Heineken Supply Chain B.V., Amsterdam (NL)

( * ) Notice: Subject to any disclaimer, the term of this patent is extended or adjusted under 35 U.S.C. 154(b) by 513 days.

(21) Appl. No.: 17/774,208

(22) PCT Filed: Nov. 11, 2020

(86) PCT No.: PCT/NL2020/050708
§ 371 (c)(1),
(2) Date: May 4, 2022

(87) PCT Pub. No.: WO2021/096355
PCT Pub. Date: May 20, 2021

(65) Prior Publication Data

US 2022/0371876 A1 Nov. 24, 2022

(30) Foreign Application Priority Data

Nov. 11, 2019 (NL) ..................................... 2024209

(51) Int. Cl.
*B67D 1/08* (2006.01)
*B67D 1/04* (2006.01)

(52) U.S. Cl.
CPC ......... *B67D 1/0888* (2013.01); *B67D 1/0462* (2013.01); *B67D 1/0858* (2013.01); *B67D 1/0884* (2013.01)

(58) Field of Classification Search
CPC ................ B67D 1/0888; B67D 1/0462; B67D 1/0858; B67D 1/0884; B67D 1/0869;
(Continued)

(56) References Cited

U.S. PATENT DOCUMENTS

2015/0336786 A1* 11/2015 Gardner .................... F24C 7/08 222/1
2016/0039652 A1 2/2016 Dherde
(Continued)

FOREIGN PATENT DOCUMENTS

CN 100582620 C * 1/2010 ............. F25D 29/00
CN 106537071 A * 3/2017 ............. F25D 11/00
(Continued)

OTHER PUBLICATIONS

International Search Report for corresponding International Application No. PCT/NL2020/050708 dated Jan. 26, 2021.

*Primary Examiner* — Emmanuel E Duke
(74) *Attorney, Agent, or Firm* — Banner & Witcoff, Ltd.

(57) ABSTRACT

A cooling system is provided for contact cooling of a beverage container. The system comprises a cooling element, a cooling contact body thermally conductively connected to the cooling element and arranged to be in thermally conductive contact with the container, a sensor module arranged to provide a sensor signal having a sensor value indicative of a contact area between the cooling contact body and the container and a processing unit arranged to control operation of the cooling element in response to the sensor signal. The contact area or another indicator for quality of contact between the cooling contact body and the beverage container determines a transfer rate of thermal energy between the beverage container and a beverage contained therein on one hand to the cooling contact body and the cooling element on the other hand. A
(Continued)

cooling system with this method of operation allows efficient use of energy provided.

19 Claims, 8 Drawing Sheets

(58) Field of Classification Search
CPC ........ B67D 1/0857; B67D 2210/00031; B67D 2210/00104
See application file for complete search history.

(56) References Cited

U.S. PATENT DOCUMENTS

| | | | |
|---|---|---|---|
| 2016/0209111 A1 | 7/2016 | Jafa et al. | |
| 2017/0176059 A1 | 6/2017 | Lundberg et al. | |
| 2017/0176095 A1* | 6/2017 | Kobos | F25D 23/02 |
| 2017/0176096 A1* | 6/2017 | Lundberg | F25D 31/006 |
| 2019/0300358 A1 | 10/2019 | Maier | |
| 2019/0368809 A1 | 12/2019 | Jafa et al. | |

FOREIGN PATENT DOCUMENTS

| | | | | |
|---|---|---|---|---|
| EP | 2103565 A1 | 9/2009 | | |
| EP | 2504269 A1 | 10/2012 | | |
| EP | 3242099 A1 | 11/2017 | | |
| JP | H09-207997 A | 8/1997 | | |
| JP | 2001-130697 A | 5/2001 | | |
| JP | 2017-514759 A | 6/2017 | | |
| WO | 2004/050537 A2 | 6/2004 | | |
| WO | 2004/051163 A2 | 6/2004 | | |
| WO | 2004050541 A2 | 6/2004 | | |
| WO | 2008/004144 A2 | 1/2008 | | |
| WO | 2011061343 A1 | 5/2011 | | |
| WO | 2017/140567 A1 | 8/2017 | | |
| WO | WO-2018009065 A1 * | 1/2018 | | B67D 1/04 |
| WO | 2018212659 | 11/2018 | | |
| WO | 2018212660 | 11/2018 | | |
| WO | 2019/243320 A1 | 12/2019 | | |

* cited by examiner

BEVERAGE CONTAINER COOLING SYSTEM FOR A BEVERAGE DISPENSING DEVICE

TECHNICAL FIELD

The various aspects and embodiments thereof relates to a cooling system for implementation in a liquid dispensing assembly. The invention relates to a cooling system for contact cooling of a container for liquid, especially for contact cooling a container and liquid contained therein to be dispensed. An aspect relates to a beverage dispensing system comprising such cooling system. Another aspect relates to a method for contact cooling a liquid container, especially a beverage container. A further aspect relates to a beverage dispensing assembly for dispensing a carbonated beverage from a plastic container.

BACKGROUND

WO2018/009065 discloses a fluid dispensing system comprising a container containing a fluid to be dispensed and a device in which the container can be at least partly inserted. The device has a contact surface for cooling the container and the fluid contained therein by contact cooling.

SUMMARY

It is preferred to provide a beverage dispensing assembly which is an alternative to the known assemblies. More in particular, there is a preference to provide a beverage dispensing assembly which is relatively easy in use. As such, a beverage dispensing assembly which is relatively easy to manufacture and maintain may be provided. And it is preferred to provide a container suitable for a dispensing assembly as claimed. One aspect and embodiments thereof aim at providing a dispensing assembly in which a container can be used, which assembly in use provides for an appearance pleasing to users, such as for example beverage purchasing public and personnel, is easy to use and/or energy friendly, especially in cooling and dispensing.

A first aspect provides a cooling system for contact cooling of a beverage container. The system comprises a cooling element, a cooling contact body thermally conductively connected to the cooling element and arranged to be in thermally conductive contact with the container, a sensor module arranged to provide a sensor signal having a sensor value indicative of a contact area between the cooling contact body and the container and a processing unit arranged to control operation of the cooling element in response to the sensor signal.

The contact area is an area over which the cooling contact body and the container make a physically contact to physically touch one another, allowing transfer of thermal energy, in particular by conduction of thermal energy from the container to the cooling contact body and vice versa. Such contact area may be a point contact, a line contact or a larger area. Whereas the skilled person understands that in mathematical theory, a line and a point do not have an area, such contact have in practice a relatively small area. Hence, the contact area is not a surface of a particular body, but an area defined when the cooling contact body and the container are in physical contact with one another.

The contact area or another indicator for quality of contact between the cooling contact body and the beverage container determines a transfer rate of thermal energy between the beverage container and a beverage contained therein on one hand to the cooling contact body and the cooling element on the other hand. In case the contact area is low or the quality of contact is otherwise such that it hampers proper transfer of thermal energy from the container and/or the beverage to the cooling contact body, the operation of the cooling element is adjusted to address this issue. A cooling system with this method of operation allows efficient use of energy provide to the cooling system.

Furthermore, this cooling system addresses issues of varying quality of containers. Plastic containers may be formed using a blow-moulding process. Whereas blow moulding is a known process that manufacturers are able to control, it is at certain points a brute force process that is at some points difficult to control, which may lead to variations in shapes of containers. This, in turn, results in variations of quality of contact, as the complementary shape of the container that the contact cooling body may provide is in most embodiments fixed.

In particular containers that comprise an internal flexible container pose a challenge. For such containers, not only the shape of the external container shell, but also the shape of the bag as an internal container shell and the contact between the external container shell and internal container shell pose challenges with respect to the quality of contact. These challenges are addressed by the cooling system according to the first aspect.

In an embodiment of the first aspect, the processing unit is arranged to control the cooling to be operative in a switched mode, wherein a first time interval during which the cooling element is instructed to operate is dependent on the sensor value. In this embodiment, a quality of contact indicator is used to determine how long the cooling element is operated to withdraw thermal energy from the cooling contact body.

In another embodiment of the first aspect, the processing unit is arranged to increase the first time interval with a decreasing contact area as indicated by the sensor value. If the contact area is small—or the quality of contact is otherwise low —, energy is withdrawn from the contact cooling body for a longer time. With a constant power of the cooling element, this means more thermal energy is withdrawn at a longer operating period. This, in turn, may result in a colder cooling contact body and a larger temperature gradient relative to the container and the beverage therein. As a result, thermal energy flows faster from the beverage to the cooling contact body, by virtue of diffusion laws.

In a further embodiment, the processing unit is arranged to operate the cooling element at a first level to withdraw thermal energy from the cooling contact surface body until a first requirement has been met and operate the cooling element at a second level lower than the first level or switch off the cooling element until a second requirement has been met. In this embodiment, the amount of energy provided to the cooling element at the first level is increased as the area indicated by the sensor value decreases and the amount of energy provided to the cooling element at the first level is decreased as the area indicated by the sensor value increases.

This embodiment allows for control of the cooling element based on variation of the quality of contact—or the contact area. As beverage is withdrawn from the container, the shape of the container may vary. As a result, the contact area may vary—for which this embodiment provides compensation.

In again another embodiment, the sensor module comprises a temperature sensor arranged for sensing temperature of at least one of the container and the cooling contact body; and the processing unit is arranged to control operation of the cooling element based on change of the sensor value over time. If the temperature of the container decreases relatively fast over time while the cooling element does not operate or operate at a low level, the contact area is assumed to be large as there is a large flow of energy from the (contents of) the container to the cooling contact body. In such case, the operating time of the cooling element may be reduced.

If the temperature of the cooling contact body increases relatively fast over time, the contact area is assumed to be relatively large as thermal energy is absorbed fast from the (beverage in) container by the contact cooling body. In such case, the operating time of the cooling element may be reduced.

In again a further embodiment, wherein the processing unit is arranged to operate the cooling element at a first level to withdraw thermal energy from the cooling contact surface body until a first requirement has been met, operate the cooling element at a second level lower than the first level or switch off the cooling element until a second requirement has been met, determine a time period between operation of the cooling element at the second level or switching off the cooling element and reaching the second requirement, and determining the first requirement based on the determined time period. This embodiment provides a practical implementation of the previous embodiment.

In yet another embodiment of the first aspect, the sensor module comprises a contact sensor arranged to provide a signal having a value indicative of a contact area between the container and the cooling contact body. Such contact sensor may be embodiment as a sensor arranged to sense conductivity between the container and the contact cooling body.

A second aspect provides a beverage dispensing system comprising a cooling system according to the first aspect or embodiments thereof.

A third aspect provides a method of cooling a liquid container by contact cooling. In this aspect, a container containing liquid is received against a contact surface of a cooling system, a cooling energy transfer rate between the contact surface and the container is determined and the cooling energy supply to the contact surface is controlled by a control unit of the cooling system based on said cooling energy transfer rate.

A variation of shapes across different containers and a fixed shape of the contact surface may result in a variation of contact or quality of contact between the contact surface and the container. This, in turn may result in a variation of the cooling energy transfer rate between the container (and the liquid therein) and the cooling system and the contact surface thereof in particular. To efficiently address this issue, the cooling energy supply is controlled based on the cooling energy transfer rate—which represents a quality of contact.

In an embodiment of the third aspect, the cooling energy transfer rate is determined by cooling the contact surface over a first period of time, and temporarily terminating cooling of the surface over a second period, and measuring the temperature of the container with at least one first sensor, wherein the duration of the second period is measured between terminating cooling and reaching a predetermined temperature of the container measured with said first sensor, wherein the cooling energy transfer rate is defined as the said duration of the second period. If the temperature of the container rises quickly, most of the container and/or content thereof will be at a higher temperature than the cooling surface. This means that the cooling energy transfer rate is low.

A further embodiment of the third aspect comprises repeating the first and second step at least once. In this embodiment, for each second period a cooling energy transfer rate is defined and consecutive cooling energy transfer rates are compared. Furthermore, in this embodiment, if the cooling energy transfer rate over at least two previous second periods increases, i.e. the duration of the second period is increasing, supply of cooling energy to the contact surface for the following first period is decreased, whereas if the cooling energy transfer rate over at least two previous second periods decreases, i.e. the duration of the second period is decreasing, supply of cooling energy to the contact surface for the following first period is increased. This embodiment provides a practical implementation of this third aspect.

In a further embodiment of the third aspect, that may be applied to the first aspect in an analogous way, the temperature of the container is measured using a temperature sensor in contact with an outer surface of the container, preferably with a contact sensor thermally isolated from the contact surface. As a proper temperature of the container and in particular the contents thereof, as well as control of that temperature is an objective, it is preferred to use a temperature value indicative thereof as a starting point. As the temperature of the contact surface may be different, the temperature sensor is preferably isolated from the contact surface.

In yet another embodiment, a remaining volume of liquid in the container is measured or calculated and the supply of cooling energy to the cooling surface is controlled based on said remaining volume of liquid, at least below a threshold value for said remaining volume. The amount of liquid in the container may determine the shape of the container and with that, a quality of contact and a cooling energy transfer rate may be affected. Hence, it is preferred to take this factor into account for accurate temperature control.

A fourth aspect provides a computer readable medium, preferably non-transitory, comprising an algorithm for controlling a cooling system according to the first aspect a beverage dispensing system of the second aspect or method according to the third aspect.

BRIEF DESCRIPTION OF THE DRAWINGS

In order to further elucidate the present invention, embodiments thereof shall be disclosed and discussed hereafter, with reference to the drawings. Therein shows.

DETAILED DESCRIPTION

Figure 1A:
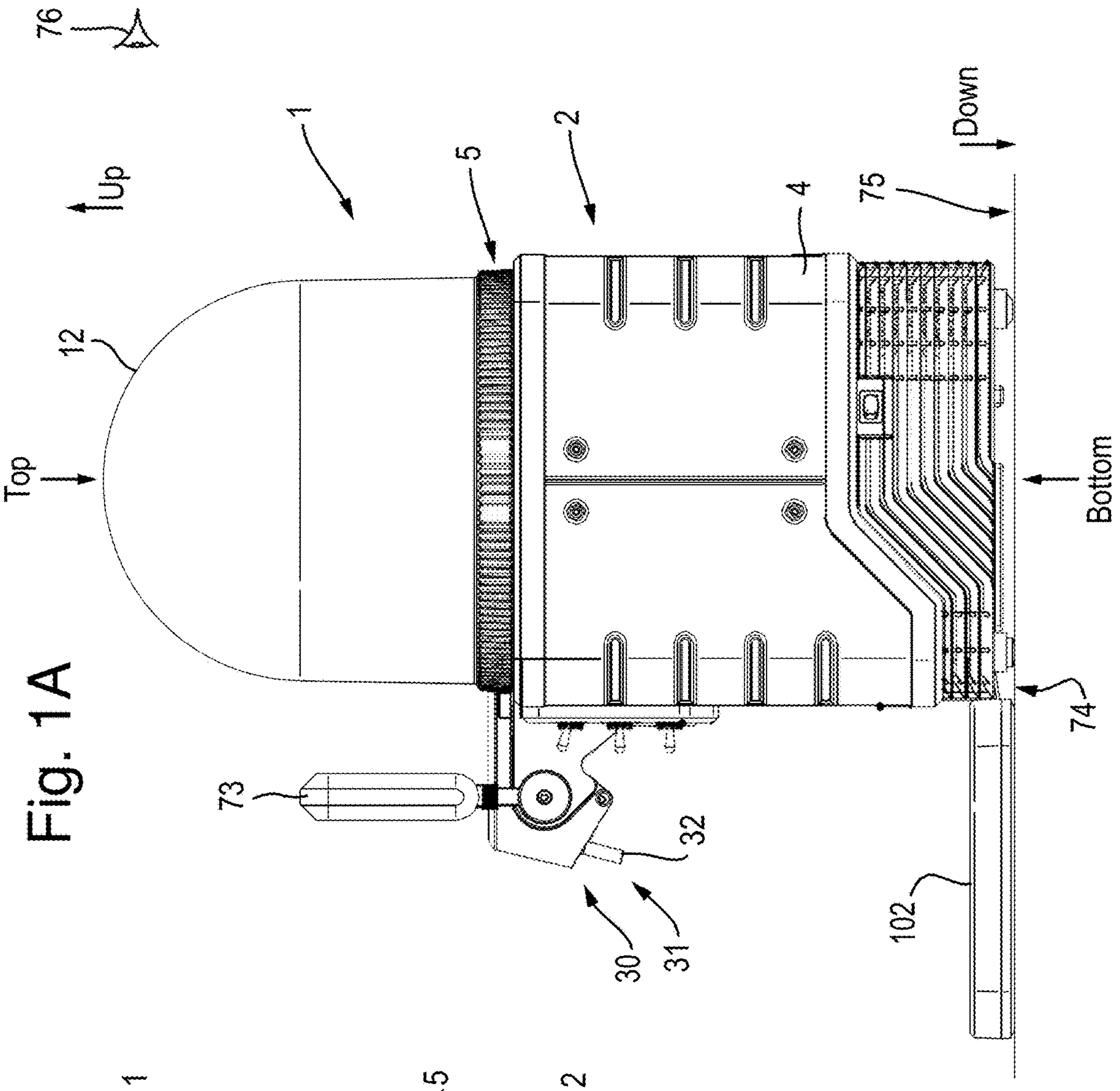
FIG. 1A a representation of a side view of an assembly of FIG. 1.

In this description embodiments are shown and disclosed of the invention, by way of example only. These should by no means be interpreted or understood as limiting the scope of the present invention in any way. In this description the same or similar elements are indicated by the same or similar reference signs. In this description embodiments of the present invention shall be discussed with reference to carbonated beverages, especially beer. However, other beverages could also be used in the present invention.

In this description references to above and below, top and bottom and the like shall be considered, unless specifically stipulated differently, to a normal orientation of a dispensing unit. The rear of the dispensing unit shall be referred to as the side at which a tap handle or the like is provided for operating the system, especially for operating for dispensing beverage contained in a container provided in and/or on the unit. The container can have a bottom part and a neck region comprising an orifice for filling and/or dispensing. The neck region can be an integral part of the container or can be assembled to the container. During use in embodiments the orifice within the assembly can be facing substantially downward, upward or sideways. A downward orientation is for example shown in the drawings, especially FIG. 1, wherein top, bottom, up and down are indicated by arrows and appropriate wording, for indicative purposes only. This does not necessarily reflect the orientation in which a tapping device of the present disclosure or parts thereof have to be used. For the container a normal position may be with a bottom portion facing down, a neck portion facing up. In a tapping assembly of the disclosure the bottom of the container may be facing up, down and/or sideways.

In the present disclosure by way of example a bag in container (BIC) shall be described, integrally blow moulded from a preform set comprising two plastic preforms, super imposed, which should be understood as meaning that one of the preforms is inserted into the other, after which they are together blow moulded in a known manner into a BIC. In embodiments prior to said blow moulding a closure ring is fitted over the preforms, connecting them together and closing off the space, which can also be referred to as interface or inter space, between the preforms, such that at least after blow moulding said space is or can be in communication with the environment only through one or more openings provided in a neck region of the container, especially an outward opening, extending through a wall of the neck region of the outer preform and/or container. The said at least one opening can be provided during manufacturing the preforms, especially during injection moulding thereof, but could also be provided later, for example by punching, drilling or otherwise machining into the container, during or after blow moulding.

In this description a tapping assembly can comprise a housing holding a cooling device and a pressure device for supplying pressurized gas, such as air, to a container. The container can be a plastic beverage container, preferably a BIC type container. The system further comprises a lid, preferably an at least partly transparent lid, fitting over the container when properly placed in the housing. The lid provides visibility of the container within the dispensing device comprising the housing and the lid, such that for example the filling level can be ascertained and branding of the container is visible from the outside.

In this description a dispensing assembly, which can also be referred to as tapping assembly, can be designed such that a container can be placed in an “upside down” position on and/or into a housing of a dispensing unit, such that at least part of the container, especially at least part of a shoulder part of the container is introduced in a receptacle on the housing, a neck portion comprising an outflow opening facing down. Preferably a part of the container extending into said receptacle, is close to or at least in part in contact with a wall of the receptacle, wherein the wall of the receptacle is cooled, especially actively cooled. In said “upside down” position this may for example part of the shoulder portion of the container. In an “upright position” the shoulder portion may for example face upward, whereby a bottom portion can be received in the receptacle, especially for cooling. In a lying position or an inclined position a side portion of the container may be received in the receptacle for cooling.

In this description relatively close regarding a distance between the wall of the receptacle and the relevant container part should be understood as a distance small enough to allow efficient cooling of the said part of the container and its content. Preferably beverage is dispensed from an area of the container next to said portion of the wall cooled. Preferably a portion of the wall in the receptacle for cooling is in these embodiments a lower part of the container. In such embodiments the advantage is obtained that the content of the container will at least be in the area which is cooled by the wall of the receptacle, even if the container is partly empty, which cooled content is close to and especially directly adjacent the outflow opening or at least in a portion where the beverage is dispensed from. Thus control of the temperature of the beverage dispensed is very well possible, even if a part of the container extending outside the receptacle is not or less cooled.

In positioning the container in the receptacle preferably at least one line contact is obtained between the container and the wall of the receptacle, for contact cooling. Such line contact can for example be formed by a circle or elliptic line or any line, for example depending on the shape of the container and the receptacle and the orientation of the container. Preferably over a relatively large part of the container, such as for example the shoulder portion, the bottom portion or wall portion of the container extending inside the receptacle contact is established or at least a close proximity of the wall of the container relative to the wall of the receptacle. A distance between the relevant part of the container and the receptacle is preferably between 0 and 1 mm, measured as the smallest distance between adjacent surfaces, more preferably between 0 and 0.5 mm, even more preferably between 0 and 0.25 mm on average over at least part of a circumferential surface area of the receptacle having a height measure along a vertical axis of the receptacle which may for example be at least about $\frac{1}{4}^{th}$ of the height or diameter of the part of the container extending in said receptacle. For example in an upside down orientation at least about a quarter of the axial height of a shoulder portion of a container may be extending into said receptacle, measured directly adjacent the neck portion. For example between a quarter of and the whole said height of the shoulder portion.

Figure 1:
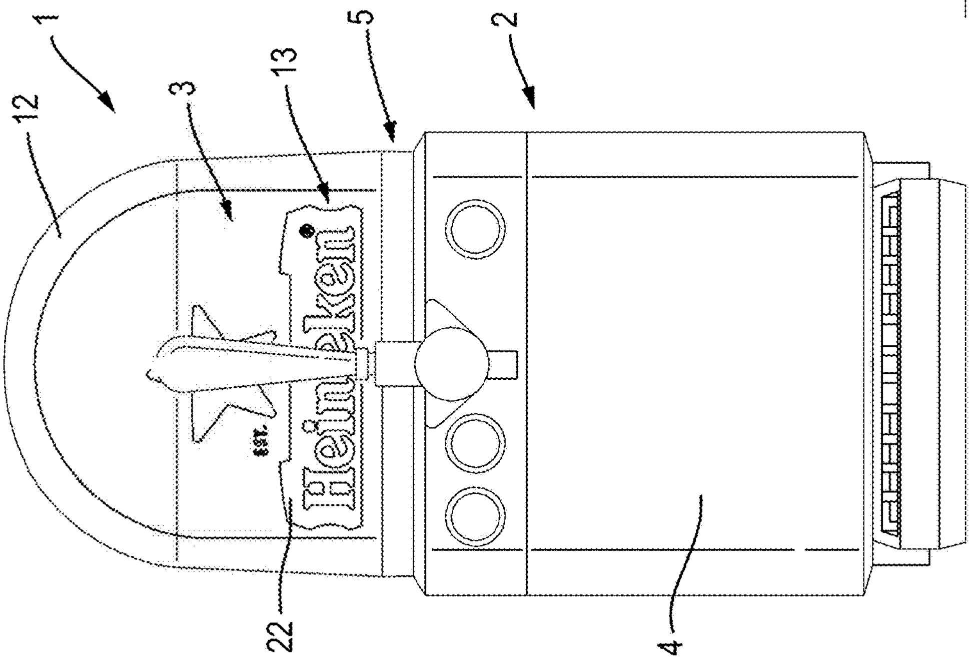
FIG. 1 a beverage dispensing assembly in a rear view, that is from a side of operating the dispensing assembly, with a branded container visible through a lid.
Figure 2A:
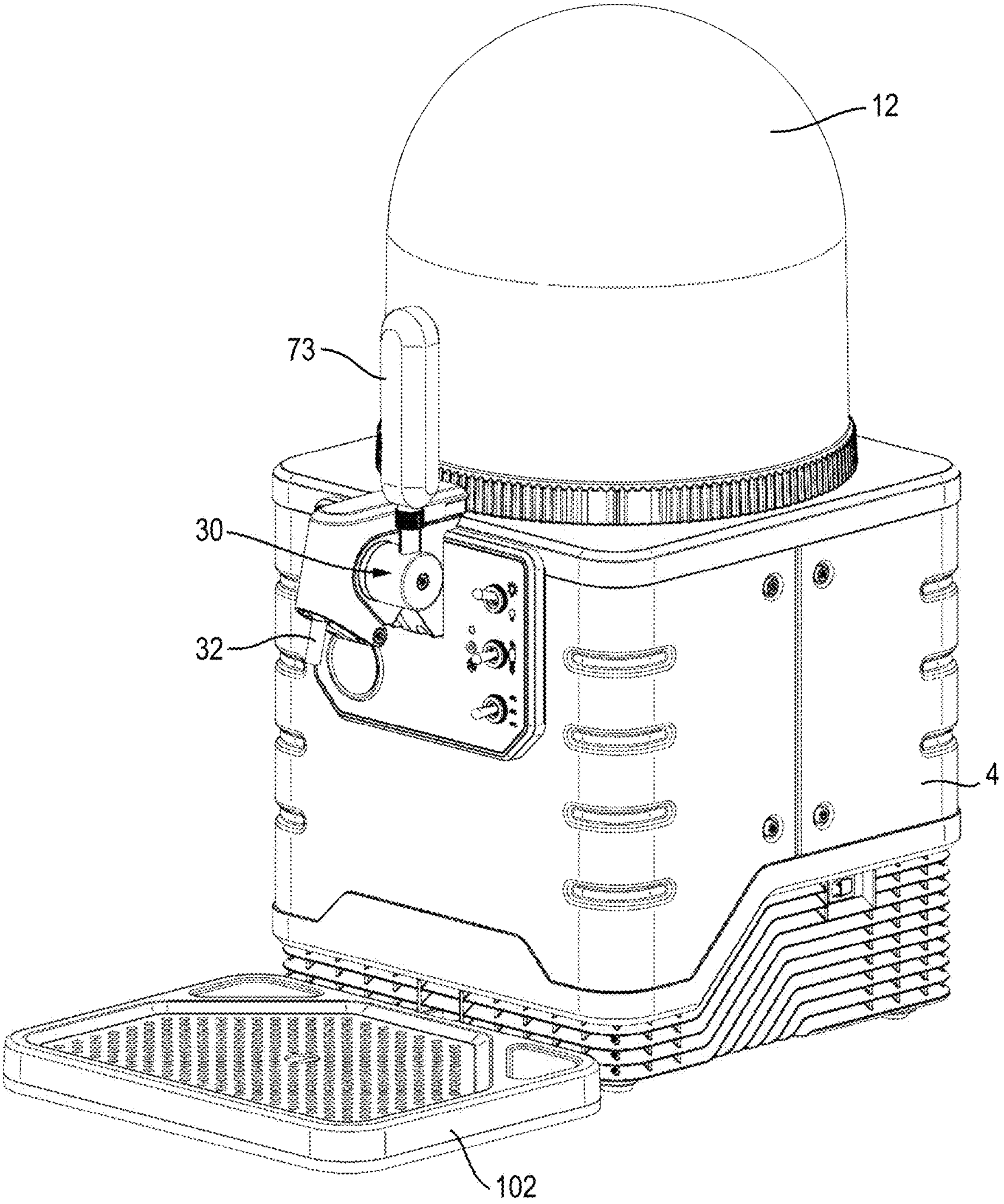
FIGS. 2A and B perspective views of an assembly of FIG. 1, in rear side view and front side view respectively.
Figure 2B:
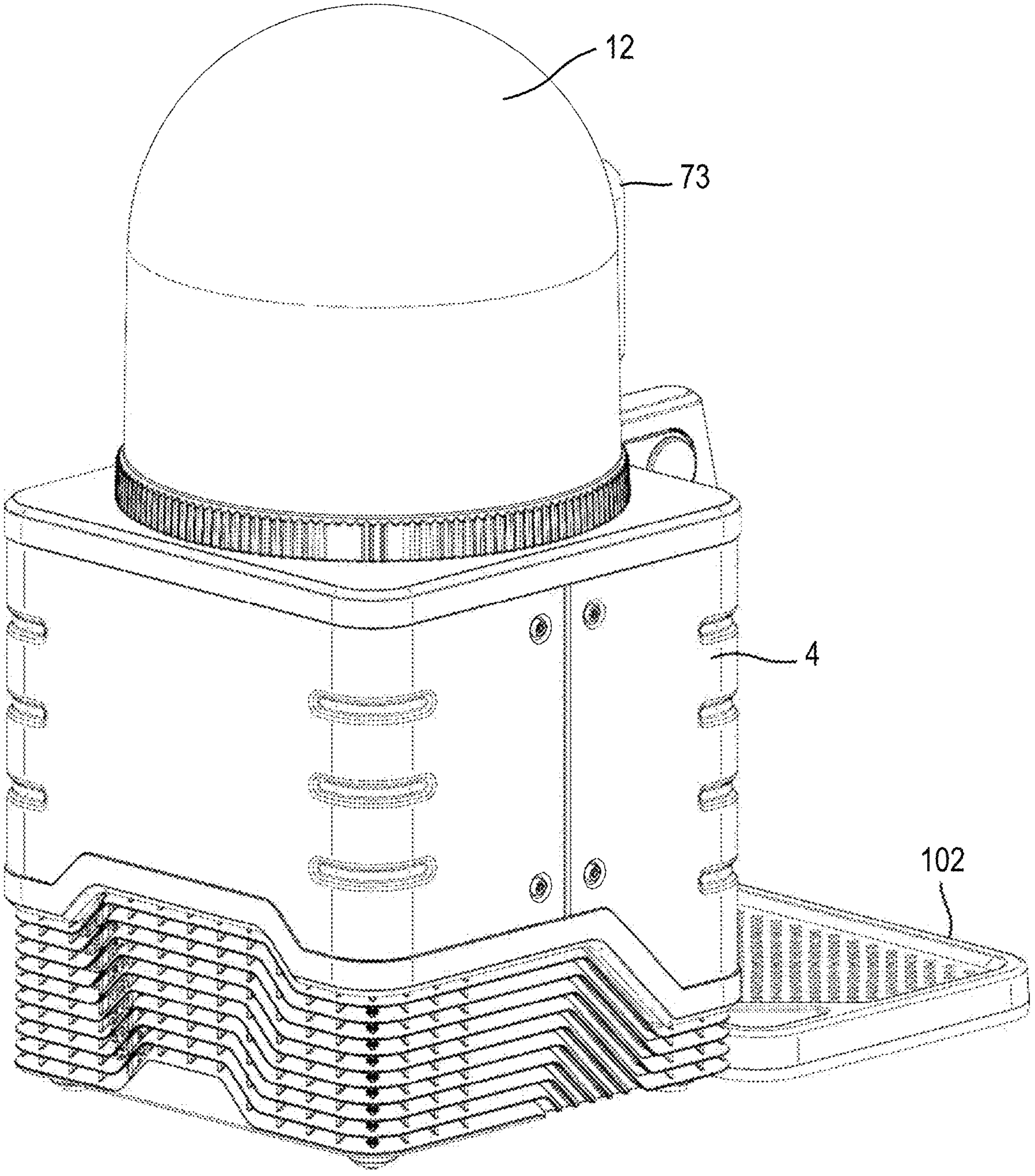

FIGS. 1 and 1A show an exemplary embodiment of a beverage dispensing assembly 1 of the disclosure, comprising a dispenser 2 and a beverage container 3. The dispenser 2 can also be referred to as for example unit, dispensing unit, tapping device or similar wording. The dispenser 2 comprises a housing 4. The housing 4 is provided with a receptacle 5 for receiving at least part 6 of the container 3. The beverage container 3 has a neck portion 7 and a shoulder portion 8 adjacent the neck portion 7. The neck portion 7 is provided with at least an outflow opening 8A and at least one gas inlet opening 9 (see e.g. FIG. 3). In the embodiments disclosed the container can be a blow moulded plastic container 3, preferably a Bag-in-Container (BIC) type container. The container 3 is positioned in the dispenser 2 with the neck portion 7 and shoulder portion 8 facing downward, such that the neck portion 7 and at least part of the shoulder portion 8 are received in the receptacle 5. This is referred to as an upside down orientation. A part 10 of the shoulder portion 8 extends close to and/or is in contact with a wall 11 of the receptacle 5.

An orientation of the container 3 in the dispensing device can be defined at least based on the orientation of a longitudinal axis X-X of the container, wherein in an upside down position and a straight up position said axis will extend substantially vertically, in a lying down position substantially horizontally and in an inclined position including an angle with both the horizontal and vertical direction. In a straight up position a bottom portion of the container may face downward, in an upside down position a bottom portion of the container may face upward, in a lying position it may face side ways.

In a different orientation of the container, the receptacle may be shaped differently. With the container lying, as specified directly above, the receptacle may be provided as a tub. In another implementation in which the container has a lying position, the receptacle may be provided as a cylinder, surrounding the container. In case visibility of the container is preferred, the receptacle may be implemented by means of one or more rings arranged to surround the container once placed in the receptacle—thus supported by the rings. Part of the container may be visible between the rings. Irrespective from any shape the receptacle may have, it is preferred there is sufficient thermally conductive contact between the receptacle and the container.

The dispensing assembly 1 is by way of example placed on a top 75 of a bar 74, such that the part 13 of the container 3 extending above the housing 4 and, if present, a lid 12 are at about eye level for an average adult person, in FIG. 1 indicated symbolically by eye 76. The top 75 of the bar can for example be, but is by no means limited to, at about 100 to 130 cm at a front side available for customers. By placing the tapping assembly 1 on a bar 74, visible for at least customers standing or sitting at the bar and preferably customers standing or sitting at the bar and personnel, standing behind the bar, the visibility of the system and especially of the relevant part 13 of the container is increased. Especially when branding 22 has been provided on said part 13 of the container 3 this will increase the appeal of the system 1 and especially of the beverage enclosed within said container 3. It has been found that this appeal will increase sales of the beverage and moreover may increase the appeal of the bar. Preferably a lid is provided over the part 13 of the container, which is sufficiently transparent to provide a view of the container part 13 from at least the front and behind of the bar 74, i.e. for customers and bar personnel, and preferably provides for a view of the container part 13 over about 360 degrees. A top part of the lid 12 could be less transparent, for example opaque.

The container 3 is preferably substantially barrel or bottle shaped, having said neck portion 7 and shoulder portion 8 and further having a body portion 23 and a bottom portion 24. The bottom portion may have any suitable shape and in the embodiment shown is substantially spherical, more specifically substantially a hemisphere. Alternatively it can for example be shaped such that the container can stand on said bottom portion 24, for example petal shaped.

In embodiments as shown a lid 12 is provided over the container 3, enclosing a part 13 of the container 3 extending outside the receptacle 5. However, the assembly can in embodiments also be operated without the lid 12. The lid 12 can be substantially dome shaped, at least to such extend that it has an inner surface 14 extending along the outer surface of the part 13 of the container 3 extending outside the housing 4, preferably at a substantially regular, equal distance. This may provide for a space 15 between said inner surface 14 of the lid 12 and the outer surface portion of the container. In embodiments the lid can have a top 16 which is substantially spherical and a body portion 17 which is preferably substantially cylindrical. The lid 12 may be made of plastic, preferably transparent plastic, such that the container 3 can be observed through at least part of the lid 12. In embodiments the lid 12 can be double walled, having an inner and an outer wall 18A, B, and a space 19 enclosed there between, preferably isolated from the surroundings thereof, such as the area 20 in which the assembly is positioned and the space 15. In embodiments the space 19 can be at a pressure lower than the pressure inside the area 20 and/or space 15, and can for example be sucked vacuum, in order to lower the heat transmissibility of the lid 12. In embodiments the lid 12 can rest on a seal 21 of the housing 4 and/or can be provided with a seal 21 for resting on the housing 4, such that the space 15 is isolated from the area 20 once the lid 12 has been properly placed on and/or in and/or over the housing. In embodiments this can provide for a substantially stagnant layer of air in said space 15. In other embodiments a fan or similar means can be provided for providing an air flow of preferably cooled air through said space 15 for cooling the container and the beverage contained therein. The lid can also be made partly or entirely of glass.

In preferred embodiments the container 3 is provided with branding 22, at least on the part 13 of the container 3 extending outside the housing 4. Said branding 22 is preferably provided such that at least part of it is provided in an upside down orientation when the container 3 is placed on its bottom 24. Thus when the container 3 is placed in an upside down position in the dispenser 2, the neck portion 7 facing down, the branding is in the proper orientation for readability and visibility. Obviously when a container 3 is intended for use in a straight up orientation, i.e. an orientation with the bottom facing down in a dispensing device 1, the branding may be in a normal position for readability and visibility. Similarly such branding could be adjusted on a container for use in another orientation, for example lying down.

In the embodiments shown in e.g. FIGS. 1 and 1A, 3 and 3A the housing 4 comprises a cooling device 26 for cooling at least a part 27 of the wall 11 of the receptacle 5. Similarly the other embodiments can be provided with the same or a similar cooling device. The receptacle 5 and cooling device 26 are preferably designed for contact cooling of a part 6 of the container 3, for example at least the shoulder portion 8 of the container 3 in the upside down orientation, or a bottom portion, for example in a straight up orientation, or at least part of a side of a body forming portion, for example in a lying position or an inclined position. As is clear from the exemplary embodiments this will lead to cooling of at least the beverage in an area close to the receptacle, such as for example close to the neck portion 7, from which the beverage will be dispensed, this beverage thus being cooled at a desired temperature. Preferably this portion is at a lower end of the container during use, such that the coolest beverage will naturally flow towards that area. The cooling of the receptacle can be provided for by any suitable means, such as a compressor based cooling device, a piezo based cooling device, ice cube cooling, liquid cooling or the like systems as known in the art. By way of example a compressor based cooling device 26 will be described, as an advantageous embodiment.

The container 3 in the embodiments as shown is provided with a dispensing unit 34 including at least a dispensing line 35 for dispensing the beverage. The housing 4 comprises a tap 29 for connecting to and/or cooperating with the dispensing line 35, for opening and/or closing the dispensing line 35. The dispensing line is preferably a disposable line, which should be understood as meaning that it is designed and intended for limited use, for example with only one container 3 or a limited number of containers. Preferably the dispensing unit 34 is designed such that the container 3 can be broached with it, after which the dispensing unit 34 and/or the dispensing line 35 cannot be removed again, without damage to the unit 34 and/or container 3.

In preferred embodiments the tap 29 comprises an operating mechanism 30 for opening and/or closing a valve 31 provided in the dispensing unit 2, especially a valve provided in or at an end of the dispensing line 35. The dispensing line 35 can be made of plastic and can be flexible, such that it can be bent as shown. The valve 31 is fixedly connected to the tapping line 35, such that it is placed and removed, i.e. exchanged together with the dispensing line 35. The valve 31 can have a spout 32 extending outside the housing 4, such that the spout 32 is the last point of contact for the beverage to be dispensed. By providing such valve 31 which is disposable contact between the beverage and the further dispensing assembly 1 can be prevented. Thus cleaning of the dispensing assembly has to be cleaned less frequently.

Alternatively other means for opening and/or closing the dispensing line 35 can be provided for, such as but not limited to means for squeezing the tapping line shut. A permanent valve can be used as part of the tapping device 2, to which the tapping line 35 can be connected when placing the container. Alternatively or additionally the tapping line can be permanent or semi permanent, wherein the container, especially an adapter 38 as discussed can be connected to said tapping line.

Figure 3A:
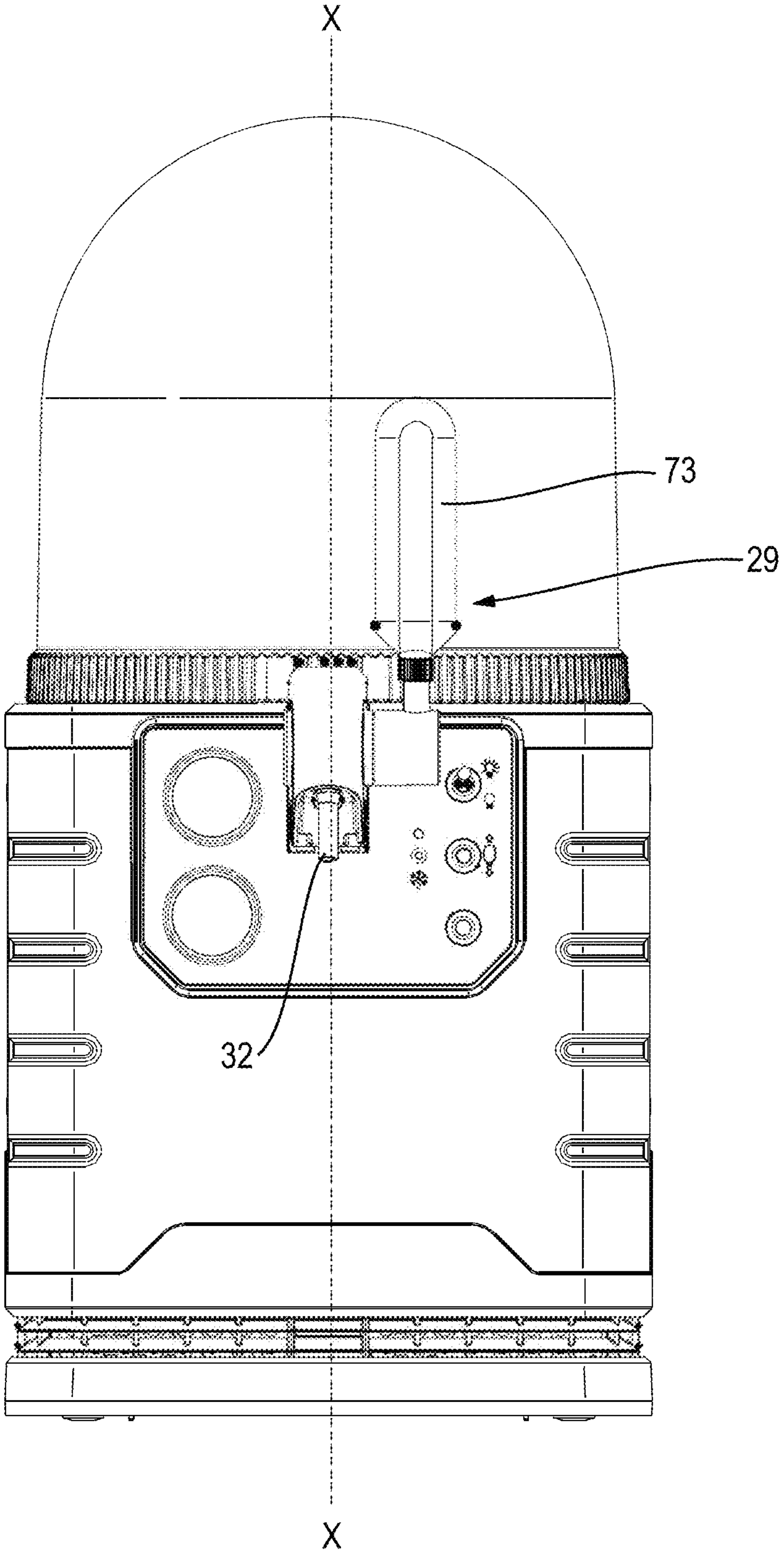
FIGS. 3A and B a dispensing assembly according to the disclosure, in rear view and in cross sectional side view.

As can for example be seen from FIG. 3A an B the receptacle 5 can or example be substantially bowl shaped, for example semi spherical, such that the container 3 can be supported by the wall 11 of said receptacle 5 by at least part of the shoulder portion 8 in the upside down position, or a bottom portion, in a straight up position. Preferably in close contact for contact cooling. At a lower end of the receptacle 5 an indentation 36 can be provided for receiving the neck portion 7 of the container, with the dispensing unit 34 or at least part thereof provided on the neck 7, when using a container in an upside down position, or for example such unit 34 connected or to be connected to a bottom portion 24, especially an inlet opening 9 of a container 3 in a straight up position for connecting a gas line. In embodiments the indentation 36 can be such that the neck 7 and/or dispensing unit 34 do not rest on a bottom 37 of the indentation 36. In embodiments using a straight up position, for example a gas line connector can be position in such indentation.

As discussed a cooling system 26 is provided in the housing 4, here shown as a compressor and evaporator based cooling system, which has cooling lines 95 or the like extending in close proximity to or inside the wall 11 of the receptacle 5 and possibly the indentation 36, for cooling the wall 11 or at least a relevant part thereof. The cooling device 26 is preferably designed to keep the wall 11 at a predefined temperature, or at least to cool the wall such that at least the beverage close to the outlet opening, i.e. in the neck 7 and possibly the shoulder portion 8 at a desired temperature or as close as possible to it. Depending on the beverage and a user preference this temperature can preferably be set, for example but not limited to between about 4 and 9 degrees Celsius, for example around 6 degrees Celsius. Other temperatures or temperature ranges can be set.

Figure 3B:
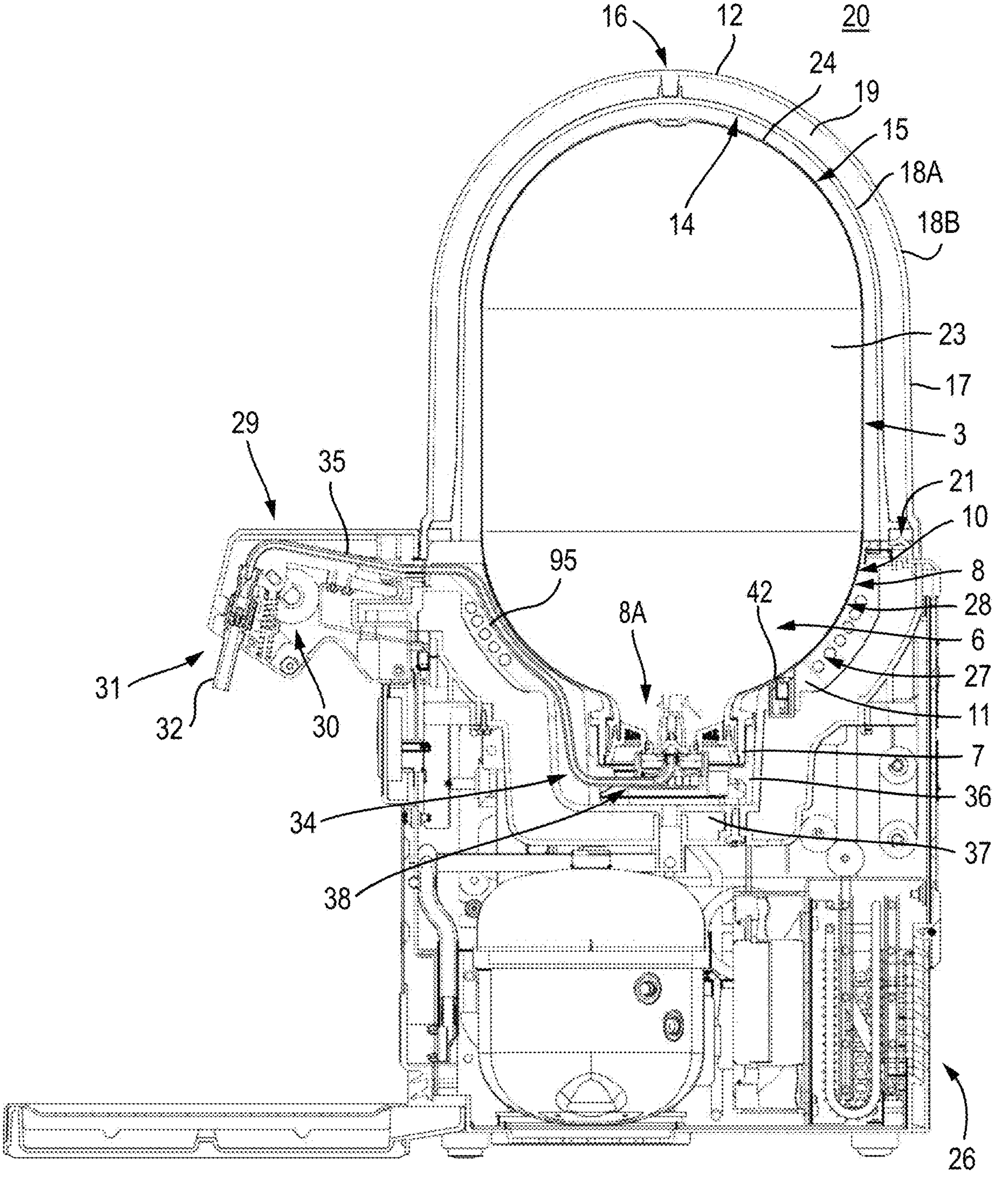
Figure 4:
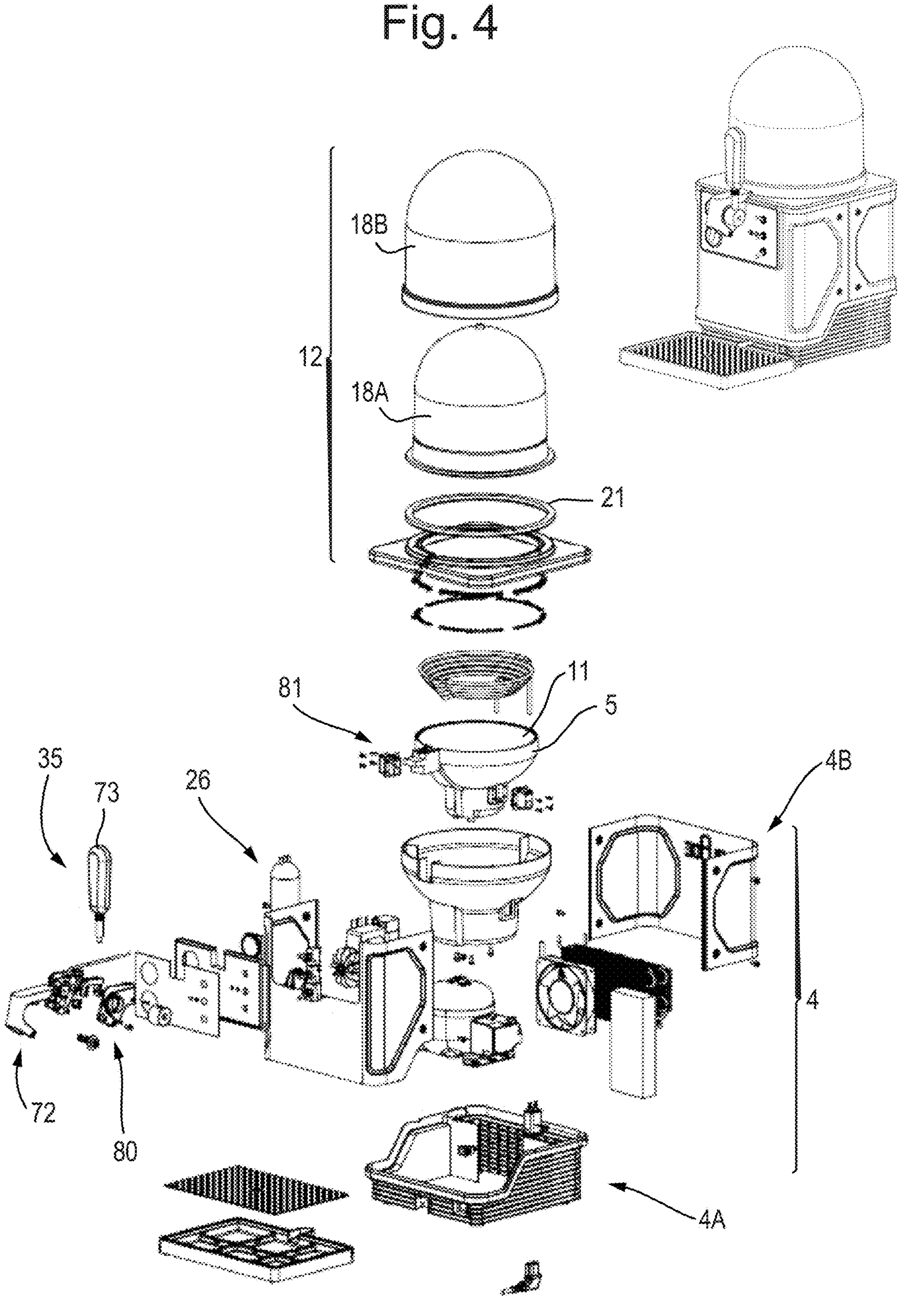
FIG. 4 an exploded view of a dispensing unit of an assembly for dispensing beverage.
Figure 5:
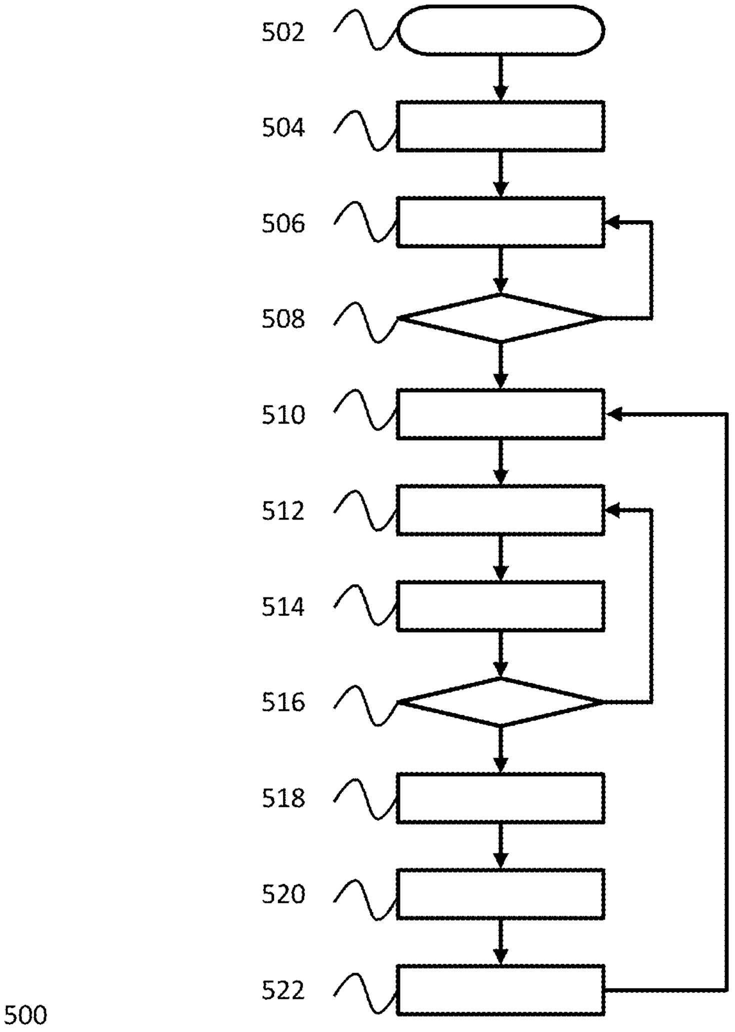
FIG. 5 shows a flow chart as an embodiment of the third aspect.

As can be seen in e.g. FIG. 3B, the shoulder portion 8 of the container can fit to the wall 11 of the receptacle closely, whereas the inner container 3B in the shoulder portion can fit snugly along the inner surface of the outer container. Thus contact cooling between the wall 11 and the shoulder portion of the container 3 has surprisingly proven to be highly effective.

It is noted that the receptacle 5 may be differently shaped, fitting other types of containers than depicted by FIG. 3B.

The container 3 is preferably mainly manufactured from a plastic and an organic polymer in particular. Such materials are resilient to a certain extend and may therefore deform under the influence of pressure, and in particular variation of differences in pressure between the environment inside and outside the container 3. Furthermore, the container 3 may deform due to variations in temperature, inside the container 3, outside the container 3, or both. This means that the container 3 may not be in direct contact with the wall 11 of the receptacle 5 over the full part of the container 3 that is held by the receptacle 5. As a result, transfer of thermal energy from the container 3—and the contents thereof—to the receptacle 5 and the cooling system 26 may not be optimal.

The transfer of thermal energy from the container 3 to the receptacle 5 and the cooling system 26 has an influence on cooling of the beverage in the container, but also on the cooling efficiency. The efficiency of cooling may be improved by taking the quality of the contact between the container and the wall 11 of the receptacle into account.

The quality of contact between the wall 11 and the container 3 may be defined as a ratio between an actual area over which the wall 11 and the container 3 are in contact on one hand and on the other hand the largest possible area of the container 3 and the wall 11 that may be in contact with one another.

The actual contact area may be measured by means of pressure sensors spread over the wall 11 or the container 3; based on an amount of pressure sensors actuated, the ratio between the actual contact area and the largest possible contact area may be determined.

Another option for determining the quality of contact is by applying a voltage between the container 3 and the wall 11 and measuring a current from the container 3 to the wall 11—or vice versa. The resistance of the contact between the container 3 and the wall 11 is proportional to the area of contact. If the resistance in a situation the largest possible contact area between the container 3 and the wall 11 is known, the actual contact area may be deduced from the actual resistance based on the actual current and voltage. It is noted that in this optional implementation, at least one of the container 3 and the wall 11 may be coated with a electrically conductive coating suitable for this objective; a fully metallic coating may not be preferred, but various coating having conductive/resistive properties are available.

With the previously discussed options, additional sensors are required for determining a quality of contact. It is also possible to determine a quality of contact by using a temperature sensor 42 (FIG. 3B) for sensing a temperature of the container 3. Alternatively, the temperature sensor 42 may be used for sensing temperature of the wall 11 of the receptacle 5.

If the temperature sensor 42 is arranged to sense temperature of the container 3, the temperature sensor 42 is preferably isolated from the wall 11 and protrudes from the wall 11 to ensure contact with the wall of the container 3. Optionally, the temperature sensor 42 may be resiliently suspended such as not to block the wall of the container 3 to fit in the receptacle 5 as good as possible and ensure good contact with the wall 11.

If the temperature sensor 42 is arranged to sense temperature of the wall 11, the temperature sensor 42 is provided such that it cannot contact the container 3 if the container 3 is provided in the receptacle 5. In another implementation, an additional temperature sensor is provided, such that the temperature sensor 42 senses temperature of a first of the wall 11 and the container 3 and the additional temperature sensor senses temperature of a second of the wall 11 and the container 3.

If the quality of contact is good, thermal energy will relatively quickly be transferred from the container 3 to the wall 11 and subsequently to the cooling system 26 and this will result in quick cooling of the container 3 and the beverage provided therein.

As the beverage gets cooler, the temperature sensor 42 sensing the container temperature will sense a decrease of temperature increase rate over time. The temperature sensor 42—in this implementation sensing container temperature—is placed against the wall of the container 3, close to the wall 11 of the receptacle 5 that is being cooled by means of the cooling system 26. Therefore, the sensed temperature of the beverage located close to the wall of the receptacle 5 will be lower than the temperature of beverage at higher locations in the container 3. As the cooling system 26 is switched off, no more thermal energy is withdrawn from the beverage in the container and the temperature distribution in the beverage will move to an equilibrium. As a result, the temperature of the beverage close to the temperature sensor 42 will rise.

Due to basic principles of thermodynamics, the rate at which the temperature rises after the cooling system 26 has been switched off depends on a temperature gradient in the beverage. If the momentary average temperature of the beverage in the container 3 is relatively low, the rising of the temperature will be at a rate lower than if the momentary average temperature of the beverage in the container 3 is relatively high.

The temperature of the beverage in the container 3 is relatively high if the cooling prior to the measurement has not been sufficient, for example due to a low quality of contact, so due to a relative small area of contact between the container 3 and the wall 11 of the receptacle. In this way, the temperature rise rate is indicative of the quality of contact. Whereas area contact is preferred, the contact may in practice be a line contact or even a point contact.

It is preferred to vary a time period over which the cooling system 26 is switched on such that if the quality of contact is low, the period is longer and if the quality of contact is high, the period during which the cooling system 26 is switched on is lower.

Figure 6A:
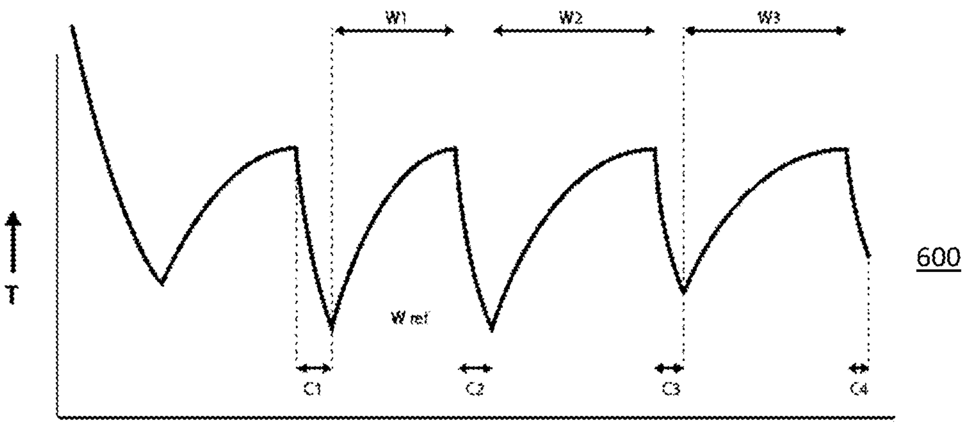
FIG. 6A shows a first graph depicting a first temperature change of time.

The operation of the cooling system will be further elucidated in conjunction with a flowchart 500 depicting an implementation of the third aspect. The procedure may be controlled by a processing unit comprised by the beverage dispensing assembly 1. Such processing unit may be a microprocessor, a microcontroller, a PLD, an FPGA or another electronic or electrical computing module arranged to fulfil this task. The various parts of the flowchart 500 may be summarised as follows:

502 start procedure
504 receive container
506 initial cooling
508 initial requirement met?
510 switch off cooling system
512 sense container temperature
514 record time
516 requirement met?
518 get temperature rise time
520 calculate cooling system operation time
522 operate cooling system over determined time The procedure starts in a terminator 502 in which the whole system is initialised. The procedure continues with step 504 by receiving the container 3 in the receptacle 5. In step 506, processing unit operating the cooling system 26 to start cooling. In FIG. 6A, this is visible in a first graph 600. The first graph depicts temperature vs. time. At the left, the initial cooling step is visible.

In step 508, the processing unit checks whether a pre-determined objective for cooling the beverage in the container 3 has been fulfilled. Such pre-determined objective may be a temperature of the container 3 or the wall 11, sensed by means of the temperature sensor 42 or another sensor.

If the container 3 has been received and the cooling operation is started for the first time, optionally, the criterion is a pre-determined amount of time. This is particular advantageous if the container 3 is sensed to have a relatively high temperature, for example 15° C. or up, 18° C. or up, 20° C. or up or 25° C. or up. This allows deep cooling of the container 3 and in particular of the beverage stored therein. Additionally or alternatively, the further steps of the procedure depicted by the flowchart 500 are only executed once the sensed temperature (sensed by means of the sensor 42) is equal to or less than a pre-determined temperature, for example −1° C. or lower, 0° C. or lower, 1° C. or lower, 2° C. or lower or 3° C. or lower, during execution of the first cooling operation after receiving a new container 3.

If the pre-determined criterion has been met—or pre-determined criteria have been met —, the cooling system 26 is switched off in step 510. Subsequently, the processing unit starts obtaining the sensed temperature in step 512 and record time in step 514.

In step 516, it is checked whether the sensed temperature is equal to or larger than a cut-on temperature. If the cut-on temperature is not reached, the processing unit continues monitoring of the sensed temperature and recording time. If the cut-off temperature is reached—or another criterion is met, like lapse of a time period, the procedure continues to step 518, in which the time period is obtained between switching off the cooling system 26 and reaching the cut-on temperature. This time period is an example of the contact quality indicating a relative or absolute contact area, contact line and/or contact point between the container 3 and the wall 11 of the receptacle 5. As discussed, the contact quality may also be determined in other ways.

In step 520, based on the obtain temperature rise time—or another contact quality factor —, a time period is obtained during which the cooling system 26 is to be switched on in a subsequent cooling step. In step 522, the processing unit controls the cooling system 26 to be operated during the time period determined in step 520. Subsequently, the procedure branches back to step 510 by switching off the cooling system.

As discussed, the operation time of the cooling system 26 decrease as time during which the temperature rises to the cut-on temperature increases. This is depicted in the first graph 610 in FIG. 6A.

Figure 6B:
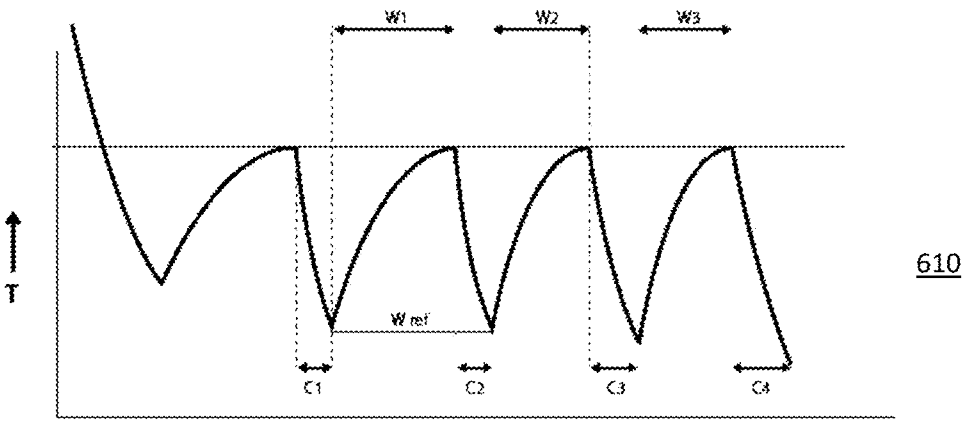
FIG. 6B shows a second graph depicting a second temperature change of time

It is also possible that the time during which the temperature rises to the cut-on temperature decreases. Such may be the case when ambient temperature rises and this is depicted in a second graph 610 in FIG. 6B. An effect of rise in ambient temperature may, additionally or alternatively, be taken into account by obtaining an ambient temperature by means of an ambient temperature sensor of which output is provided to the processing unit.

With a decreasing amount of beverage in the container 3, the container 3 may deform. Such deformation may lead to a decreased contact area between the container and the wall 11 of the receptacle 5. With a small contact area, a small amount of thermal energy will be transferred from the beverage in the container 3 to the receptacle 11 per unit of time. With the application of the cooling algorithm as discussed above, this means that the on time of the cooling device 26 will be low. Yet, a small amount of beverage will increase in temperature rapidly, in particular at higher ambient temperatures, which means more cooling may be required.

To address this conflict, the amount of beverage in the container 3 may be taken into account for determining the time during which the cooling device 26 is switched on. The amount of beverage in the container 3 may be determined by obtaining an initial volume—usually known upfront for a pre-determined container—and by determining an amount of beverage that has left the container. The amount of beverage that has left the container may be determined in several ways. For example, the beverage dispensing assembly 1 may be provided with a flow meter arranged to determine an amount of beverage flowing through the dispensing line 35 or otherwise flowing out of the container.

Additionally or alternatively, time during which the valve 31 is open may be determined. The valve 31 has a known flow rate and by determining a total amount of time during which the valve 31 has been open since a full container 3 has been installed in the receptacle, an amount of beverage that has left the container 3 may be determined. And with an initial amount known, the amount of beverage left in the container 3 may be determine. In another embodiment, additionally or alternatively, the weight of the container 3 with the beverage therein may be determined. With a pre-determined weight of an empty container 3 known, the amount of beverage left in the container may be determined.

Based on the amount of beverage left in the container 3, the temperature of the container 3 measured by means of the sensor 42, a target temperature of the beverage and cooling power of the cooling device 26, an amount of time may be determined during which the cooling device 26 needs to be switched on to obtain a target temperature of the beverage in the container 3. Also a type of beverage may be taken into account; some beverages have a higher thermal capacity than others.

In one embodiment, the temperature of the container 3 sensed by the temperature sensor 42 is assumed to be substantially the same as the temperature of the beverage. In another embodiment, the sensed temperature is corrected; the temperature sensed may be assumed to be 1° C. or 2° C. higher or lower than the actual temperature of the beverage. The ambient temperature of the beverage dispensing system 1 may be taken into account at this step.

The time during which the cooling device 26 is to be switched on thus determined is subsequently compared to the time determined by means of the procedure depicted by the flowchart 500. For the cooling, preferably the longest time interval for cooling is applied.

The routine described above, taking into account the amount of beverage left in the container 3 for determining the time during which the cooling device 26 is switched on, may be employed when only a pre-determined amount of beverage is left in the container. A reason for that may be that with a relatively large amount of beverage left in the container, long cooling—required to fully cool down the total amount of beverage in the container 3—may result in a too low temperature of the wall 11 of the receptacle, which may result in freezing of beverage in the dispensing line 35. Hence, it may be preferred to define a maximum time for activity of the cooling device 26. In such embodiment, the longest cooling time of the cooling times determined by the two algorithms as described above is selected and of the selected cooling time and the maximum cooling time, the shortest cooling time is selected.

The invention is by no means limited to the embodiments specifically disclosed and discussed here above. Many variations thereof are possible, including but not limited to combinations of parts of embodiments shown and described. For example the at least one opening 9 can be provided in a different position, for example extending through the closure ring 47, preferably in substantially radial direction outward, for example through the inner surface or wall of the ring, into the space between the containers, wherein the adapter 38 can extend into the ring for communicating properly with said at least one opening 9. The container can be provided with only one opening in the neck or several such openings. In embodiments the container can be a single wall container, wherein the gas can be inserted directly into the beverage, for example $CO_2$ or nitrogen gas ($N_2$). In embodiments the container can be compressible by pressurizing the space within the lid. In embodiments the closure ring 47 and adapter 38 can be integrated. They can then be connected directly onto the container 3 as a closure and be suitable as the adapter. In embodiments the dispense adapter and the adapter can be integrated, with each other and/or with the closure ring. Instead of a valve in the container a different closure can be used, for example a pierceable closure, pierceable by the adapter and/or the dispense adapter, or a removable closure which can then be replaced with the adapter and/or dispense adapter for cooperation with the tapping device.

These and many other amendments are considered to have been disclosed herein also, including but not limited to all combinations of elements of the invention as disclosed, within the scope of the invention as presented.

The invention claimed is:

1. A cooling system for contact cooling of a beverage container, the system comprising:

a cooling element;

a cooling contact body thermally conductively connected to the cooling element and arranged to be in thermally conductive contact with the beverage container;

a sensor module arranged to provide a sensor signal having a sensor value indicative of a contact area between the cooling contact body and the container;

a processing unit arranged to control operation of the cooling element in response to the sensor signal wherein the processing unit is arranged to operate the cooling element at a first level to withdraw thermal energy from the cooling contact body until a first requirement has been met;

operate the cooling element at a second level lower than the first level or switch off the cooling element until a second requirement has been met;

wherein:

the amount of energy provided to the cooling element at the first level is increased as the contact area indicated by the sensor value decreases; and the amount of energy provided to the cooling element at the first level is decreased as the contact area indicated by the sensor value increases.

2. The cooling system according to claim 1, wherein the processing unit is arranged to control the cooling element to be operative in a switched mode, wherein a first time interval during which the cooling element is instructed to operate is dependent on the sensor value.

3. The cooling system according to claim 2, wherein the processing unit is arranged to increase the first time interval with a decreasing contact area as indicated by the sensor value.

4. The cooling system according to claim 1, wherein:

the sensor module comprises a temperature sensor arranged for sensing temperature of at least one of the container and the cooling contact body; and the processing unit is arranged to control operation of the cooling element based on change of the sensor value over time.

5. The cooling system according to claim 4, wherein the processing unit is arranged to:

operate the cooling element at a first level to withdraw thermal energy from the cooling contact surface body until a first requirement has been met;

operate the cooling element at a second level lower than the first level or switch off the cooling element until a second requirement has been met;

determine a time period between operation of the cooling element at the second level or switching off the cooling element and reaching the second requirement;

determining the first requirement based on the determined time period.

6. The cooling system according to claim 5, wherein the first requirement is at least one of:

an amount of energy provided to the cooling element;

an amount of time;

a temperature sensed by the sensor module.

7. The cooling system according to claim 5, wherein the second requirement is at least one of:

an amount of time;

temperature.

8. The cooling system according to claim 5, wherein:

the first requirement is a time period during which the cooling element is operated;

the second requirement is a temperature;

the time period as the first requirement is increased as the determined time period decreases; and the time period as the first requirement is decreased as the determined time period increases.

9. The cooling system according to claim 1, further comprising an ambient temperature sensor for determining a temperature of ambient air around the cooling system.

10. The cooling system according to claim 1, wherein the sensor module comprises a contact sensor arranged to provide a signal having a value indicative of a contact area between the container and the cooling contact body.

11. The cooling system according to claim 10, wherein the contact sensor is at least one of:

a conductivity measurement sensor;

a pressure sensor.

12. A beverage dispensing system comprising a cooling system according to claim 1.

13. A method of cooling a liquid in a container by contact cooling, wherein:

a container containing liquid is received against a contact surface of a cooling system;

a cooling energy transfer rate between the contact surface and the container is determined; and the cooling energy supply to the cooling system is controlled by a control unit of the cooling system based on said cooling energy transfer rate.

14. The method of cooling according to claim 13, wherein the cooling energy transfer rate is determined by:

cooling the contact surface over a first period of time, and temporarily terminating cooling of the contact surface over a second period, and measuring the temperature of the container with at least one first sensor, wherein the duration of the second period is measured between terminating cooling and reaching a predetermined temperature of the container measured with said first sensor, wherein the cooling energy transfer rate is defined as the said duration of the second period.

15. The method of cooling according to claim 14, further comprising:

repeating the first and second step at least once;

wherein for each second period a cooling energy transfer rate is defined;

wherein consecutive cooling energy transfer rates are compared and:

if the cooling energy transfer rate over at least two previous second periods increases, i.e. the duration of the second period is increasing, decreasing supply of cooling energy to the cooling system for the following first period; whereas if the cooling energy transfer rate over at least two previous second periods decreases, i.e. the duration of the second period is decreasing, increasing supply of cooling energy to the cooling system for the following first period.

16. The method of cooling according to claim 13, wherein the temperature of the container is measured using a temperature sensor in contact with an outer surface of the container, preferably with a contact sensor thermally isolated from the contact surface.

17. The method of cooling according to claim 13, wherein a remaining volume of liquid in the container is measured or calculated and the supply of cooling energy to the cooling system is controlled based on said remaining volume of liquid, at least below a threshold value for said remaining volume.

18. The method of cooling according to claim 13, wherein supply of cooling energy to the cooling system is controlled such that a convection flow of liquid in the container is initiated and/or maintained by subsequent cooling and non-cooling of the contact surface.

19. A computer readable medium, comprising instructions which, when executed by an electronic processing unit, enable the processing unit to cause the electronic processing unit to carry out a method according to claim 13.

* * * * *